E. P. H. CAPRON.
Gate.
No. 77,251.
Patented April 28, 1868.
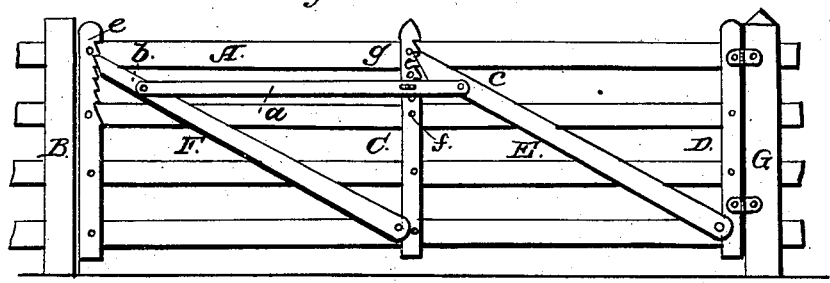
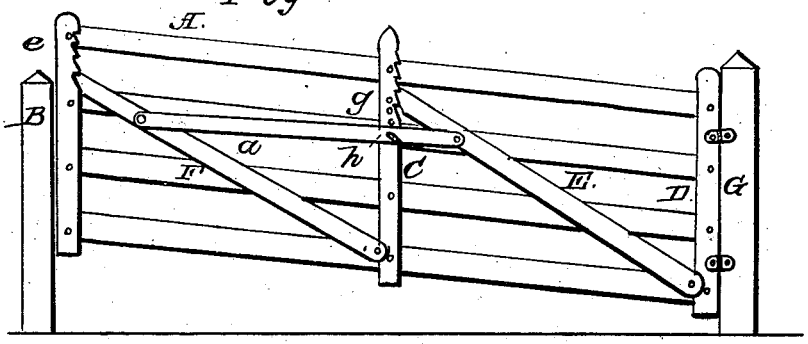
Witnesses.
P. T. Dodge.
L. Hailer
Inventor
E. R. H. Capron
by Dodge & Munn
Attys

United States Patent Office.

E. P. H. CAPRON, OF SPRINGFIELD, OHIO.

*Letters Patent No. 77,251, dated April 28, 1868.*

IMPROVEMENT IN FARM-GATES.

*The Schedule referred to in these Letters Patent and making part of the same.*

TO ALL WHOM IT MAY CONCERN:

Be it known that I, E. P. H. CAPRON, of Springfield, in the county of Clark, and State of Ohio, have invented certain new and useful Improvements in "Gates;" and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to gates, and consists in constructing them so as to be adjustable in order that they may be kept on a line parallel with the ground, or may be partially elevated, so as to allow small animals, as swine or sheep, to pass under them. In the drawings—

Figure 1 is a front elevation of my gate when on a line with the fence.

Figure 2 is a view of my gate when elevated; and

Figure 3 is a top plan view.

I construct my gate of any size desired, and in the usual form, of longitudinal rails, A, and cross-bars B, C, and D, as shown in figs. 1 and 2. I place these cross-bars on each side of the longitudinal rails A, and attach them by means of pins, $d$, and in such a manner as to allow the rails A to move or turn upon them. On the upper rear side of the cross-bars B, at the front end of the gate, and of the cross-bars C, at the middle of the gate, I make a series of ratchet-teeth, $e$, as shown in figs. 1 and 2; and just in front of the lower ends of the cross-bars C and D, and to the lowest rail, A, on each side of the gate, I pivot the braces E and F, made of the requisite length to reach the ratchets $e$, and to engage in them, as shown in figs. 1 and 2.

The braces E and F, I connect by means of a bar, $a$, which I attach by pins $b$ and $c$. The pins $b$ and $c$ extend through and connect the braces E and F on each side of the gate. They are placed in loosely, so as to form a joint or hinge, and so that the braces E and F will move together.

In the connecting-bar $a$, I make a hole, $h$, and in the cross-bar C a series of holes, $g$, and when I desire to lock the gate at any desired position, either straight or elevated, I insert in the hole $h$, of the bar $a$, a pin, $f$, which passes into one of the holes $g$, in the cross-bar C, as may be desired.

In operating my gate, I hang it, in any of the usual methods, to the post G, as shown in figs. 1 and 2, and in line with the fence, the braces E and F being engaged in the ratchets $e$, as shown in fig. 1. When thus in line, and whenever it becomes desirable to elevate it so as to allow swine or sheep, or small animals of any kind, to pass under, I raise it, as shown in fig. 2, when it will be held in position by the braces E and F, which engage in the ratchets $e$, as shown. If it is desired to hold the gate firmly in this elevated position, I insert the pin $f$. By means of the pin $f$ the gate may be made comparatively firm in whatever vertical position it may be placed, and cannot be raised by the cattle when the pin $f$ is inserted, as shown clearly in fig. 3.

The person operating my gate can readily do so while standing near its front end. At that point he can control the latch, raise the gate, and, by means of the bar $a$, adjust the braces E and F.

An adjustable gate of this description possesses many advantages over a rigid one. By elevating it, as shown, swine, sheep, and other small animals, may be readily driven from a field containing cattle and horses, without allowing the latter to get out.

At the same time it is strong, the braces E and F being short and firm, and not liable to spring. The strain is equally divided between them. The ratchet-plates $e$, being on both the cross-bars B and C, on each side of the gate, will securely hold the braces E and F in whatever position they may be placed. And by means of the connecting-bar $a$, both sets of braces on each side of the gate can be conveniently and promptly adjusted at the same time.

Having thus described my invention, what I claim, is—

1. A gate, consisting of the longitudinal bars A, cross-bars B, C, and D, braces E F, connecting-bar $a$, and ratchets $e$, constructed and arranged to operate substantially as herein described.

2. In a gate, adjustable as described, I claim the use of a pin, $f$, for the purpose as herein set forth, and in the manner described.

E. P. H. CAPRON.

Witnesses:
   J. K. MOWER,
   GEO. MOWER.